US011773800B2

(12) United States Patent
Sugimoto (10) Patent No.: US 11,773,800 B2
(45) Date of Patent: Oct. 3, 2023

(54) CONTROLLER AND CONTROL METHOD FOR HYBRID ELECTRIC VEHICLE (71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 35 days.

(21) Appl. No.: 17/552,329

(22) Filed: Dec. 15, 2021

(65) Prior Publication Data
US 2022/0195955 A1 Jun. 23, 2022

(30) Foreign Application Priority Data

Dec. 21, 2020 (JP) .................................. 2020-211813

(51) Int. Cl.
B60W 20/00 (2016.01)
F02D 41/12 (2006.01)
B60W 10/04 (2006.01)
B60W 20/15 (2016.01)
B60W 10/08 (2006.01)
F02D 41/00 (2006.01)
B60W 10/06 (2006.01)

(52) U.S. Cl.
CPC ............ F02D 41/123 (2013.01); B60W 10/04 (2013.01); B60W 20/15 (2016.01); B60W 10/06 (2013.01); B60W 10/08 (2013.01); B60W 2510/068 (2013.01); F01N 2900/1602 (2013.01); F02D 41/0087 (2013.01)

(58) Field of Classification Search
CPC ...... B60W 10/08; B60W 10/06; B60W 10/04; B60W 20/15; B60W 2510/068; F02D 41/0087; F02D 41/123; B01N 2900/1602
See application file for complete search history.

(56) References Cited

U.S. PATENT DOCUMENTS 7,377,250 B1 * 5/2008 Duffy .................... B60W 10/08
123/192.1
8,116,924 B2 * 2/2012 Wakashiro ............ B60W 10/06
180/65.21

(Continued)

FOREIGN PATENT DOCUMENTS

JP       2000291457 A    10/2000
JP       2009248698 A    10/2009
JP        201865448 A     4/2018

Primary Examiner — Gonzalo Laguarda
(74) Attorney, Agent, or Firm — HAUPTMAN HAM, LLP (57) ABSTRACT A controller for a hybrid electric vehicle includes an engine ECU and a HEVECU. The engine ECU executes a partial cylinder fuel cut-off control that stops supply of fuel to one or more cylinders and supplies fuel to the remaining ones of the cylinders. Further, the engine ECU sends control information of the partial cylinder fuel cut-off control to the HEVECU. The HEVECU executes a driving force compensation control so as to compensate for, using driving force of a motor generator, a decrease in driving force of a multi-cylinder engine that results from the execution of the partial cylinder fuel cut-off control. The engine ECU prohibits the execution of the partial cylinder fuel cut-off control when an anomaly possibly occurs in the sending and receiving of the control information of the partial cylinder fuel cut-off control.

9 Claims, 5 Drawing Sheets (56) References Cited

U.S. PATENT DOCUMENTS

| | | | |
|---|---|---|---|
| 10,780,772 B2* | 9/2020 | Deshpande | B60L 50/10 |
| 11,274,619 B2* | 3/2022 | Nose | F02D 41/025 |
| 11,427,181 B2* | 8/2022 | Sugimoto | F02D 41/0087 |
| 11,566,570 B1* | 1/2023 | Fujitake | F02D 41/0085 |
| 2018/0106206 A1 | 4/2018 | Tsunoda et al. | |
| 2021/0107451 A1* | 4/2021 | Nose | B60K 6/445 |
| 2022/0242393 A1* | 8/2022 | Ikeda | F01N 3/023 |

* cited by examiner

CONTROLLER AND CONTROL METHOD FOR HYBRID ELECTRIC VEHICLE

RELATED APPLICATIONS

The present application claims priority of Japanese Application Number 2020-211813 filed on Dec. 21, 2020, the disclosure of which is hereby incorporated by reference herein in its entirety.

BACKGROUND

1. Field

The present disclosure relates to a controller and a control method for a hybrid electric vehicle.

2. Description of Related Art

Japanese Laid-Open Patent Publication No. 2018-65448 discloses a typical hybrid electric vehicle (HEV) that includes a multi-cylinder internal combustion engine and an electric motor. The exhaust system of the internal combustion engine includes a filter that traps particulate matter (hereinafter referred to as PM), such as soot, contained in exhaust gas. In the hybrid electric vehicle, a regeneration control is regularly executed for the filter. In the regeneration control for the filter, fuel cut-off is executed to stop the supply of fuel to at least one of the cylinders of the internal combustion engine. In the fuel cut-off, the filter is supplied with oxygen-containing air so that the filter is heated. As a result, the PM is burned and the filter is regenerated.

Further, Japanese Laid-Open Patent Publication No. 2009-248698 discloses a typical controller for a hybrid electric vehicle that includes a multi-cylinder internal combustion engine and an electric motor. The controller includes an engine electronic control unit that controls the internal combustion engine and a HEV electronic control unit that controls the vehicle. In this controller, when a requested power for the internal combustion engine becomes less than a threshold value, the engine electronic control unit executes fuel cut-off that stops the supply of fuel to the cylinders of the internal combustion engine and sends the information related to the execution of the fuel cut-off to the HEV electronic control unit. When receiving the fuel cut-off execution information, the HEV electronic control unit calculates a driving force that lacks due to the fuel cut-off. The HEV electronic control unit outputs the lacking driving force to the electric motor at the point in time at which a correction start time has elapsed from when the fuel cut-off was started.

To heat a catalyst included in the exhaust system of the multi-cylinder internal combustion engine through fuel cut-off, an anomaly may occur in the sending and receiving of the control information of the fuel cut-off between the engine electronic control unit and the HEV electronic control unit. Examples of the anomaly is a communication anomaly such as delay or interruption that occurs in the sending and receiving of the data related to the information of whether executing the fuel cut-off cylinder is permitted and the data related to the crank position of a fuel cut-off cylinder, for which fuel cut-off is executed. In such a case, the driving force of the electric motor cannot compensate for a decrease in the driving force caused by the fuel cut-off at a proper point in time. Thus, the decrease in the driving force caused by the fuel cut-off cannot be synchronized with the compensation for the driving force by the electric motor. This potentially varies driving forces applied to the driven wheels and thus worsens the drivability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To heat a catalyst included in an exhaust system of a multi-cylinder internal combustion engine through fuel cut-off that stops the supply of fuel to at least one of the cylinders, a communication anomaly may occur between electronic control units. In such a case, it is an objective of the present disclosure to limit variations in a driving force that occur due to asynchronization between a decrease in the driving force caused by the fuel cut-off and compensation for the driving force executed by an electric motor.

To solve the above-described problem, a first aspect of the present disclosure provides a controller for a hybrid electric vehicle. The hybrid electric vehicle includes a multi-cylinder internal combustion engine including an exhaust system provided with a catalyst that purifies exhaust gas and includes an electric motor. The hybrid electric vehicle is configured to transmit, to a driven wheel, driving force from the multi-cylinder internal combustion engine and the electric motor. The controller includes a first electronic control unit and a second electronic control unit. The first electronic control unit is configured to execute a partial cylinder fuel cut-off control that stops supply of fuel to at least one of cylinders and supplies fuel to the remaining ones of the cylinders other than the at least one of cylinders and configured to send control information of the partial cylinder fuel cut-off control to the second electronic control unit. The second electronic control unit is configured to receive the control information of the partial cylinder fuel cut-off control and then execute a driving force compensation control that controls the electric motor based on the received control information of the partial cylinder fuel cut-off control so as to compensate for, using the driving force of the electric motor, a decrease in the driving force of the multi-cylinder internal combustion engine that results from the execution of the partial cylinder fuel cut-off control. The first electronic control unit is further configured to prohibit the execution of the partial cylinder fuel cut-off control when an anomaly possibly occurs in the sending and receiving of the control information of the partial cylinder fuel cut-off control between the first electronic control unit and the second electronic control unit.

In this disclosure, the first electronic control unit prohibits the execution of the partial cylinder fuel cut-off control when an anomaly possibly occurs in the sending and receiving of the control information of the partial cylinder fuel cut-off control between the first electronic control unit, which executes the partial cylinder fuel cut-off control, and the second electronic control unit, which executes the driving force compensation control. This limits the variations in the driving force that occur due to asynchronization between the decrease in the driving force resulting from the fuel cut-off control and the compensation for the driving force by the electric motor.

It is preferred that the controller further include a third electronic control unit. It is preferred that the third electronic control unit be configured to calculate a command value used to compensate for, using the driving force of the electric motor, the decrease in the driving force of the multi-cylinder internal combustion engine based on the received control information of the partial cylinder fuel cut-off control and configured to send the command value to the third electronic control unit. It is preferred that the third electronic control unit be configured to receive the command value and then control driving of the electronic control unit in correspondence with the received command value. It is preferred that the first electronic control unit be further configured to prohibit the execution of the partial cylinder fuel cut-off control when an anomaly possibly occurs in the sending and receiving of the command value between the second electronic control unit and the third electronic control unit.

In this disclosure, the first electronic control unit prohibits the execution of the partial cylinder fuel cut-off control when an anomaly possibly occurs in the sending and receiving of the control information of the partial cylinder fuel cut-off control between the second electronic control unit, which calculates the command value used to compensate for, using the driving force of the electric motor, the decrease in the driving force of the multi-cylinder internal combustion engine, and the third electronic control unit, which controls driving of the electronic control unit in correspondence with the command value. This limits the variations in the driving force that occur due to asynchronization between the decrease in the driving force resulting from the fuel cut-off control and the compensation for the driving force by the electric motor.

In the controller, it is preferred that the first electronic control unit be configured to permit the execution of the partial cylinder fuel cut-off control when a rotational speed of the multi-cylinder internal combustion engine is greater than or equal to a specific rotational speed even if an anomaly possibly occurs in the sending and receiving of the control information of the partial cylinder fuel cut-off control between the first electronic control unit and the second electronic control unit.

In this disclosure, the first electronic control unit permits the execution of the partial cylinder fuel cut-off control when the rotational speed of the multi-cylinder internal combustion engine is greater than or equal to the specific rotational speed even if an anomaly possibly occurs in the sending and receiving of the control information of the partial cylinder fuel cut-off control between the first electronic control unit and the second electronic control unit. The variations in the driving force are smaller when the rotational speed of the multi-cylinder internal combustion engine is greater than or equal to the specific rotational speed than when the rotational speed is less than the specific rotational speed. Thus, the first electronic control unit permits the execution of the partial cylinder fuel cut-off control when the rotational speed of the multi-cylinder internal combustion engine is greater than or equal to the specific rotational speed even if an anomaly possibly occurs in the sending and receiving of the control information of the partial cylinder fuel cut-off control between the first electronic control unit and the second electronic control unit, thereby limiting the variations in the driving force and executing the partial cylinder fuel cut-off.

To solve the above-described problem, a second aspect of the present disclosure provides a controller for a hybrid electric vehicle. The hybrid electric vehicle includes a multi-cylinder internal combustion engine including an exhaust system provided with a catalyst that purifies exhaust gas and includes an electric motor. The hybrid electric vehicle is configured to transmit, to a driven wheel, driving force from the multi-cylinder internal combustion engine and the electric motor. The controller includes a first electronic control unit and a second electronic control unit. The first electronic control unit includes circuitry configured to execute a partial cylinder fuel cut-off control that stops supply of fuel to at least one of cylinders and supplies fuel to the remaining ones of the cylinders other than the at least one of cylinders and configured to send control information of the partial cylinder fuel cut-off control to the second electronic control unit. The second electronic control unit includes circuitry configured to receive the control information of the partial cylinder fuel cut-off control and then execute a driving force compensation control that controls the electric motor based on the received control information of the partial cylinder fuel cut-off control so as to compensate for, using the driving force of the electric motor, a decrease in the driving force of the multi-cylinder internal combustion engine that results from the execution of the partial cylinder fuel cut-off control. The circuitry of the first electronic control unit is further configured to prohibit the execution of the partial cylinder fuel cut-off control when an anomaly possibly occurs in the sending and receiving of the control information of the partial cylinder fuel cut-off control between the first electronic control unit and the second electronic control unit.

To solve the above-described problem, a third aspect of the present disclosure provides a method for controlling a hybrid electric vehicle. The hybrid electric vehicle includes a multi-cylinder internal combustion engine including an exhaust system provided with a catalyst that purifies exhaust gas, an electric motor, a first electronic control unit, and a second electronic control unit. The hybrid electric vehicle is configured to transmit, to a driven wheel, driving force from the multi-cylinder internal combustion engine and the electric motor. The method includes, by the first electronic control unit, executing a partial cylinder fuel cut-off control that stops supply of fuel to at least one of cylinders and supplies fuel to the remaining ones of the cylinders other than the at least one of cylinders and sending control information of the partial cylinder fuel cut-off control to the second electronic control unit. The method includes, by the second electronic control unit, receiving the control information of the partial cylinder fuel cut-off control and then executing a driving force compensation control that controls the electric motor based on the received control information of the partial cylinder fuel cut-off control so as to compensate for, using the driving force of the electric motor, a decrease in the driving force of the multi-cylinder internal combustion engine that results from the execution of the partial cylinder fuel cut-off control. The method includes, prohibiting the execution of the partial cylinder fuel cut-off control by the first electronic control unit when an anomaly possibly occurs in the sending and receiving of the control information of the partial cylinder fuel cut-off control between the first electronic control unit and the second electronic control unit.

In this disclosure, the execution of the partial cylinder fuel cut-off control by the first electronic control unit is prohibited when an anomaly possibly occurs in the sending and receiving of the control information of the partial cylinder fuel cut-off control between the first electronic control unit, which executes the partial cylinder fuel cut-off control, and the second electronic control unit, which executes the driving force compensation control. This limits the variations in the driving force that occur due to asynchronization between the decrease in the driving force resulting from the fuel cut-off control and the compensation for the driving force by the electric motor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment according to the present invention will now be described with reference to the drawings.

Figure 1:
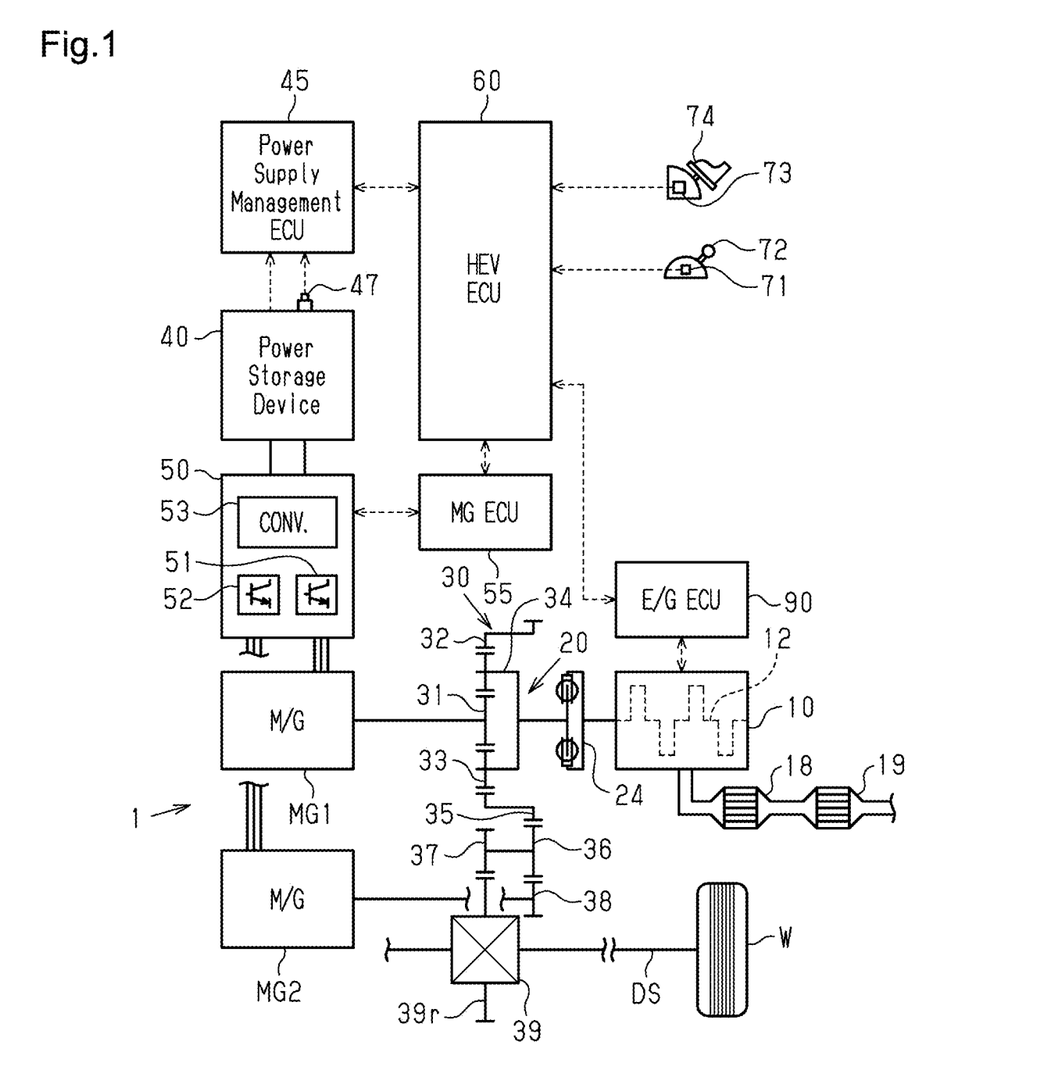
FIG. 1 is a diagram schematically showing the configuration of a vehicle according to the present disclosure.

FIG. 1 is a diagram schematically showing the configuration of a hybrid electric vehicle 1 of the present disclosure. The hybrid electric vehicle 1 shown in FIG. 1 includes a multi-cylinder engine (hereinafter simply referred to as engine) 10 with multiple (for example, four in the present embodiment) cylinders (combustion chambers) 11, a single-pinion planetary gear 30, motor generators MG1 and MG2 that are both synchronous power generation electric motors (three-phase alternating current electric motors), a power storage device (battery) 40, a power controller (hereinafter referred to as PCU) 50 that is connected to the power storage device 40 and drives the motor generators MG1 and MG2, and a hybrid electronic control unit (hereinafter referred to as HEVECU) 60 that controls the entire vehicle.

Figure 2:
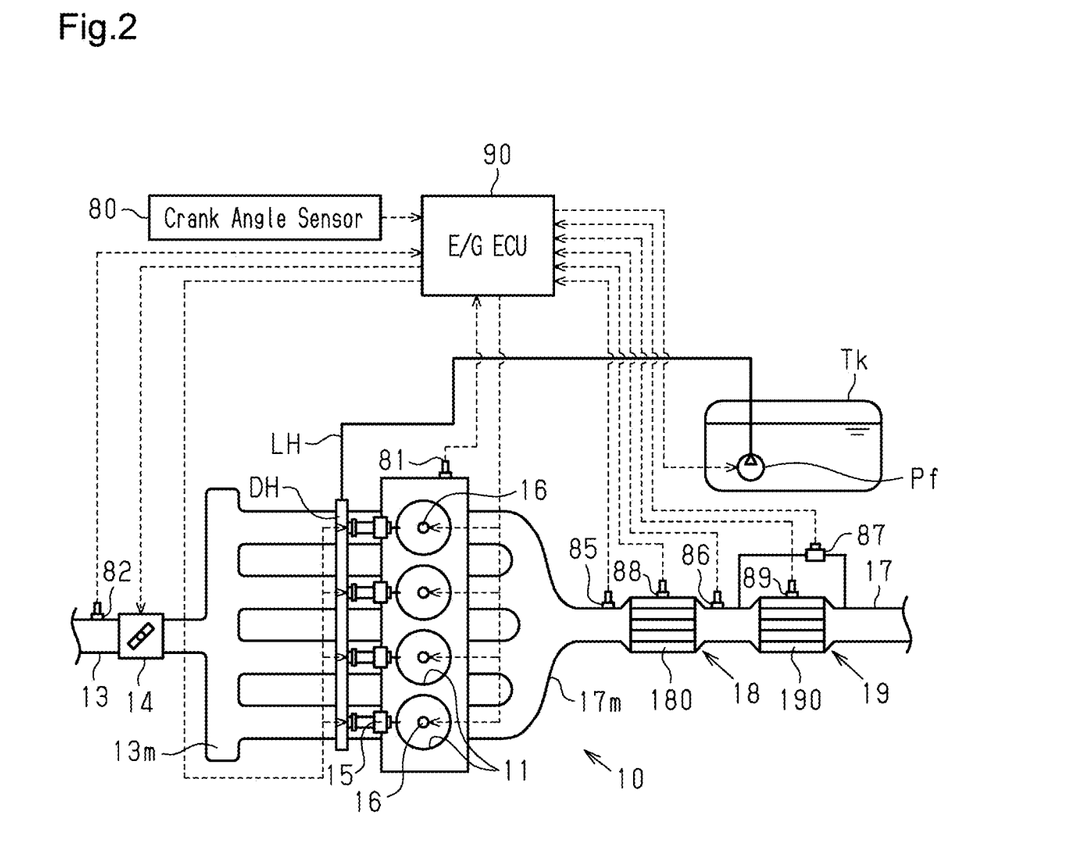
FIG. 2 is a diagram schematically showing the configuration of the multi-cylinder engine of FIG. 1.

FIG. 2 is a diagram schematically showing the configuration of the engine 10 of FIG. 1. The engine 10 is an in-line gasoline engine (internal combustion engine) that converts, into the rotational motion of a crankshaft (output shaft) 12, the reciprocating motion of the piston (not shown) caused by the combustion of the mixture of hydrocarbon fuel and air in the cylinders 11. The engine 10 includes an intake pipe 13, an intake manifold 13m, a throttle valve 14, direct injection valves 15, intake valves and exhaust valves (not shown), ignition plugs 16, an exhaust manifold 17m, and an exhaust pipe 17. One end of the intake manifold 13m is connected to the intake pipe 13. The other end of the intake manifold 13m is connected to the intake port of each cylinder 11. The throttle valve 14 is an electronically-controlled throttle valve capable of changing the area of the passage of the intake pipe 13. Each direct injection valve 15 directly injects fuel into the corresponding cylinder 11. Each ignition plug 16 ignites the mixture of fuel and air in the corresponding cylinder 11 by discharging the cylinder 11. One end of the exhaust manifold 17m is connected to the exhaust port of each cylinder 11. The other end of the exhaust manifold 17m is connected to the exhaust pipe 17.

The engine 10 further includes a fuel tank Tk that stores fuel, a delivery pipe DH that distributes fuel to the direct injection valves 15, a fuel supply pipe LH that supplies the fuel to the delivery pipe DH, and a pump Pf that pumps up the fuel from the fuel tank Tk to the fuel supply pipe LH. The pump Pf is an electric pump that is driven by power from an auxiliary battery. The pump Pf may be a mechanical pump that is driven by the engine 10.

The exhaust pipe 17 of the engine 10 includes an upstream purification device 18 and a downstream purification device 19. The upstream purification device 18 includes an exhaust gas purification catalyst (three-way catalyst) 180 that absorbs nitrogen oxide (NOx). The exhaust gas purification catalyst 180 removes carbon harmful components, such as carbon monoxide (CO), hydrocarbon (HC), and NOx in the exhaust gas from each cylinder 11. The downstream purification device 19 is located downstream of the upstream purification device 18. The downstream purification device 19 includes a gasoline particulate filter (GPF) 190 that traps particulate matter (microparticles) in exhaust gas. In the present embodiment, the GPF 190 supports the NOx-absorbing exhaust gas purification catalyst (three-way catalyst).

The engine 10 is controlled by an engine electronic control unit (engine ECU) 90. The engine ECU 90 includes a microcomputer with a CPU, ROM, RAM, and input/output interface, which are not shown in the drawings, various drive circuits, various logic ICs, and the like. The engine ECU 90 executes an intake air amount control, a fuel injection control, and an ignition timing control for the engine 10. The engine ECU 90 receives, via an input port (not shown), detection values of, for example, a crank angle sensor 80, a coolant temperature sensor 81, an air flow meter 82, a throttle valve position sensor (not shown), an upstream air-fuel ratio sensor 85, a downstream air-fuel ratio sensor 86, a differential pressure sensor 87, an upstream catalyst temperature sensor 88, and a downstream catalyst temperature sensor 89.

The crank angle sensor 80 detects the rotation position (crank position) of the crankshaft 12. The coolant temperature sensor 81 detects a coolant temperature Tw of coolant flowing through the engine. The air flow meter 82 detects an intake air amount GA of the engine. The upstream throttle valve position sensor detects the angle (throttle position) of the throttle valve 14. The upstream air-fuel ratio sensor 85 detects an upstream air-fuel ratio AFf. The upstream air-fuel ratio AFf is the air-fuel ratio of exhaust gas flowing between the exhaust manifold 17m and the upstream purification device 18. The downstream air-fuel ratio sensor 86 detects a downstream air-fuel ratio AFr. The downstream air-fuel ratio AFr is the air-fuel ratio of exhaust gas flowing between the upstream purification device 18 and the downstream purification device 19. The differential pressure sensor 87 detects a differential pressure ΔP of exhaust gas on the upstream and downstream side of the GPF 190. The upstream catalyst temperature sensor 88 detects a temperature (catalyst temperature) Tct of the upstream purification device 18 (exhaust gas purification catalyst 180). The downstream catalyst temperature sensor 89 detects a temperature (filter temperature) Tpf of the downstream purification device 19 (GPF 190).

The engine ECU 90 uses the crank position from the crank angle sensor 80 to calculate a rotational speed Ne of the engine 10 (crankshaft 12). The engine ECU 90 uses at least one of a drive history method and a differential pressure method to calculate a deposition amount Dpm of the particulate matter in the GPF 190 at a specific time interval. When using the drive history method, the engine ECU 90 calculates the current value of the deposition amount Dpm by adding, to the previous value of the deposition amount Dpm, an estimated increase amount or an estimated decrease amount of particulate matter based on the running state of the engine 10. The estimated increase amount of particulate matter is calculated as, for example, the product of an estimated discharge amount of particulate matter, a discharge coefficient of particulate matter, and a trap ratio of the GPF 190 that are calculated from the rotational speed Ne of the engine 10, a load ratio of the engine 10, and the coolant temperature Tw. The estimated decrease amount of particulate matter is calculated as, for example, the product of a combustion amount and a correction coefficient of particulate matter calculated from the previous value of the deposition amount Dpm, an inflow air flow rate, and the temperature Tpf of the GPF 190. When using the differential pressure method, the engine ECU 90 refers to the differential pressure ΔP, which is detected by the differential pressure sensor 87, to calculate the deposition amount Dpm of the particulate matter that deposits in the GPF 190.

The engine 10 may be a diesel engine including a diesel particulate filter (DPF) or may be a liquid petroleum gas (LPG) engine. The engine 10 may be a port injection engine that injects fuel into the port of each cylinder 11 or may include the port injection engine and a direct injection engine that directly injects fuel into each cylinder 11. The temperature Tct of the exhaust gas purification catalyst 180 and the temperature Tpf of the GPF 190 may be estimated from, for example, the intake air amount GA, the rotational speed Ne, the temperature of exhaust gas, the upstream air-fuel ratio AFf, and the downstream air-fuel ratio AFr.

As shown in FIG. 1, the planetary gear 30 is a differential rotation mechanism that includes a sun gear (first element) 31, a ring gear (second element) 32, and a planetary carrier (third element) 34 that rotationally supports pinion gears 33. A rotor of the motor generator MG1 is coupled to the sun gear 31. The crankshaft 12 of the engine 10 is coupled to the planetary carrier 34 via a damping mechanism 24. The ring gear 32 is integrated with a counter drive gear 35 that serves as an output member. The ring gear 32 and the counter drive gear 35 are coaxial and rotate integrally.

The counter drive gear 35 is coupled to right and left wheel assemblies (driven wheels) W via a counter driven gear 36 that meshes with the counter drive gear 35, a final drive gear (drive pinion gear) 37 that rotates integrally with the counter driven gear 36, a final driven gear (differential ring gear) 39r that meshes with the final drive gear 37, a differential gear 39, and a drive shaft DS. Thus, the planetary gear 30, a gear train from the counter drive gear 35 to the final driven gear 39r, and the differential gear 39 transmit some of the output torque of the engine 10 (power generation source) to the wheel assemblies W and form a transaxle 20. The transaxle 20 couples the engine 10 to the motor generator MG1.

A drive gear 38 is fixed to a rotor of the motor generator MG2. The drive gear 38 has a smaller number of teeth than the counter driven gear 36 and meshes with the counter driven gear 36. Thus, the motor generator MG2 is coupled to the right and left wheel assemblies W via the counter driven gear 36, the final drive gear 37, the final driven gear 39r, the differential gear 39, and the drive shaft DS.

The motor generator MG1 can be activated as a power generator that converts, into electricity, at least some of the power from the engine 10 that is operated with load. The motor generator MG2 can be activated as an electric motor that is driven by at least one of the power from the power storage device 40 and the power from the motor generator MG1 and generates a driving torque to the drive shaft DS. That is, in the hybrid electric vehicle 1, the motor generator MG2 (power generation source) and the engine 10 function as power generation devices that output driving torques (driving forces) to the wheel assemblies W coupled to the drive shaft DS. In addition, the motor generator MG2 outputs a regenerative braking torque when braking the hybrid electric vehicle 1. The motor generators MG1 and MG2 are capable of exchanging power with the power storage device 40 via the PCU 50 and exchanging power with each other via the PCU 50.

The power storage device 40 is, for example, a lithium-ion rechargeable battery or a nickel-metal hydride rechargeable battery. The power storage device 40 is managed by a power supply management electronic control unit (hereinafter referred to as the power supply management ECU) 45 that includes a microcomputer with, for example, a CPU, ROM, RAM, and input/output interface, which are not shown in the drawings. The power supply management ECU 45 obtains, for example, a state of charge (SOC), an allowable charge power Win, and an allowable discharge power Wout of the power storage device 40 using, for example, an inter-terminal voltage VB from a voltage sensor (not shown) of the power storage device 40, a charging/discharging current IB from a current sensor (not shown), and a battery temperature Tb from a temperature sensor 47.

The PCU 50 includes, for example, a first inverter 51 that drives the motor generator MG1, a second inverter 52 that drives the motor generator MG2, and a converter (voltage conversion module) 53 capable of increasing the power from the power storage device 40 and decreasing the power from the motor generators MG1 and MG2. The PCU 50 is controlled by a motor generator electronic control unit (hereinafter referred to as the MGECU) 55 that includes a microcomputer with a CPU, ROM, RAM, and input/output interface, which are not shown in the drawings, various drive circuits, various logic ICs, and the like. The MGECU 55 obtains, for example, command signals from the HEVECU 60, the voltages in the converter 53 prior to and subsequent to being increased, a detection value of a resolver (not shown) that detects the rotation positions of the rotors of the motor generators MG1 and MG2, and phase currents applied to the motor generators MG1 and MG2. The MGECU 55 uses these signals and the like to execute switching control for first inverter 51, the second inverter 52, and the converter 53, thereby controlling the driving of the motor generators MG1 and MG2. Further, the MGECU 55 uses the detection value of the resolver to calculate rotational speeds Nm1 and Nm2 of the rotors of the motor generators MG1 and MG2.

The HEVECU 60 includes a microcomputer with a CPU, ROM, RAM, and input/output interface, which are not shown in the drawings, various drive circuits, various logic ICs, and the like. The HEVECU 60 exchanges information (communication frame) with, for example, the engine ECU 90, the power supply management ECU 45, and the MGECU 55 with each other via a common communication wire (multiplex communication bus), which is not shown. The common communication wire is a controller area network (CAN) bus that includes two communication wires (wire harnesses), namely, Lo and Hi. The HEVECU 60 is individually connected to the engine ECU 90, the power supply management ECU 45, and the MGECU 55 via a dedicated communication wire (local communication bus). The dedicated communication wire is a CAN bus that includes two communication wires (wire harnesses), namely, Lo and Hi. The HEVECU 60 individually exchanges information (communication frame) with each of the engine ECU 90, the power supply management ECU 45, and the MGECU 55 via a corresponding dedicated communication wire. In addition, the HEVECU 60 obtains, for example, a signal from a start switch (not shown) that commands activation of the system of the hybrid electric vehicle 1, a shift position SP of a shift lever 72 detected by a shift position sensor 71, an accelerator pedal Acc (the depression amount of an accelerator pedal 74) detected by an accelerator pedal position sensor 73, a vehicle speed V detected by a vehicle speed sensor (not shown), and a crank position from the crank angle sensor 80 of the engine 10. The HEVECU 60 further obtains, for example, the state of charge (SOC), the allowable charge power Win, and the allowable discharge power Wout of the power storage device 40 from the power supply management ECU 45 and obtains the rotational speeds Nm1 and Nm2 of the motor generators MG1 and MG2 from the MGECU 55.

For the traveling of the hybrid electric vehicle 1, the HEVECU 60 refers to a requested torque setting map (not shown) to obtain a requested torque Tr* (including a requested braking torque) that should be output to the drive shaft DS corresponding to the accelerator pedal Acc and the vehicle speed V. Further, the HEVECU 60 uses the requested torque Tr* and a rotational speed Nds of the drive shaft DS to set a requested travel power Pd* (Pd*=Tr* x Nds) requested for the traveling of the hybrid electric vehicle 1. Furthermore, the HEVECU 60 determines whether to operate the engine 10 with load, for example, using the requested torque Tr* and the requested travel power Pd* and using a target charging/discharging power Pb* and the allowable discharge power Wout of the power storage device 40, which are additionally set.

When operating the engine 10 with load, the HEVECU 60 uses, for example, the requested travel power Pd* and the target charging/discharging power Pb* to set a requested power Pe* (Pe*=Pd*−Pb*+Loss) for the engine 10. Further, the HEVECU 60 sets a target rotational speed Ne* of the engine 10 corresponding to the requested power Pe* such that the engine 10 runs efficiently and the target rotational speed Ne* does not fall below a lower limit rotational speed Nelim that corresponds to, for example, the running state of the hybrid electric vehicle 1. Furthermore, the HEVECU 60 sets torque commands Tm1* and Tm2* for the motor generators MG1 and MG2 corresponding to, for example, the requested torque Tr* and the target rotational speed Ne* in a range of the allowable charge power Win and the allowable discharge power Wout of the power storage device 40. To stop the running of the engine 10, the HEVECU 60 sets the requested power Pe*, the target rotational speed Ne*, and the torque command Tm1* to zero. The HEVECU 60 also sets the torque command Tm2* in the range of the allowable charge power Win and the allowable discharge power Wout of the power storage device 40 such that the torque corresponding to the requested torque Tr* is output to the drive shaft DS from the motor generator MG2.

The HEVECU 60 sends the requested power Pe* and the target rotational speed Ne* to the engine ECU 90 and sends the torque commands Tm1* and Tm2* to the MGECU 55. The engine ECU 90 uses the requested power Pe* and the target rotational speed Ne* to execute, for example, the intake air amount control, the fuel injection control, and the ignition timing control. In the present embodiment, the engine ECU 90 generally executes the fuel injection control such that the air-fuel ratio in each cylinder 11 of the engine 10 becomes a stoichiometric air-fuel ratio, which is obtained by subtracting 14.7 from 14.6. In the present embodiment, the fuel injection to the cylinders 11 and ignition of the cylinders 11 are executed in the order (ignition order) of a first cylinder #1, a third cylinder #3, a fourth cylinder #4, and a second cylinder #2.

The MGECU 55 uses the torque commands Tm1* and Tm2* to execute switching control for the first inverter 51, the second inverter 52, and the converter 53. When the engine 10 is operated with load, the motor generators MG1 and MG2 are controlled such that the motor generators MG1 and MG2 convert, into torque, some of the power output from the engine 10 (when the power storage device 40 is charged) or all the power output from the engine 10 (when the power storage device 40 is discharged) together with the planetary gear 30 and output the converted torque to the drive shaft DS. Thus, the power from the engine 10 and the power from the motor generator MG2 cause the hybrid electric vehicle 1 to travel. When the running of the engine 10 is stopped, the hybrid electric vehicle 1 travels using only the power from the motor generator MG2.

A communication anomaly such as delay or interruption may occur in a communication frame between the engine ECU 90 and the HEVECU 60. In such a case, the engine ECU 90 uses the accelerator pedal Acc and the vehicle speed V, regardless of the requested power Pe* and the target rotational speed Ne* sent from the HEVECU 60, to execute the intake air amount control, the fuel injection control, and the ignition timing control, thereby causing the hybrid electric vehicle 1 to travel in a fail-safe mode only by operating the engine 10.

As described above, the hybrid electric vehicle 1 of the present embodiment includes the downstream purification device 19, which includes the GPF 190, as an exhaust gas purification device. The deposition amount Dpm of the particulate matter in the GPF 190 increases as the travel distance of the hybrid electric vehicle 1 increases and as the ambient temperature decreases. Thus, in the hybrid electric vehicle 1, after the deposition amount Dpm of particulate matter in the GPF 190 increases, the GPF 190 needs to be regenerated by delivering a large amount of air (i.e., oxygen) to the GPF 190 that has been sufficiently heated and by burning the particulate matter. Accordingly, in the hybrid electric vehicle 1, when the engine 10 is operated with load in correspondence with the depression of the accelerator pedal 74 by the driver of the hybrid electric vehicle 1, the engine ECU 90 executes a gasoline particulate filter regeneration necessity determination routine illustrated in FIG. 3 at the specific time interval.

Figure 3:
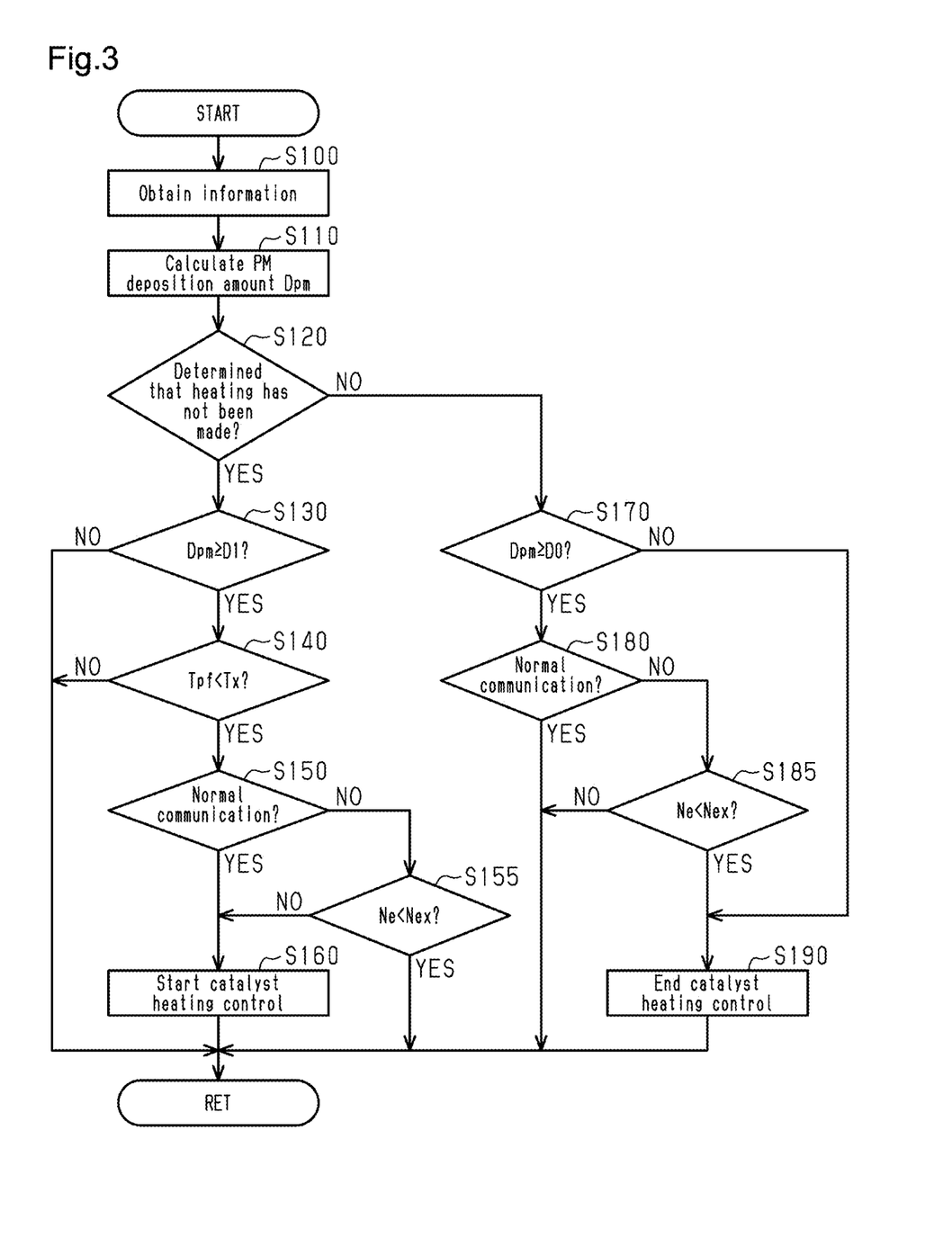
FIG. 3 is a flowchart illustrating a gasoline particulate filter regeneration necessity determination routine executed in the vehicle of FIG. 1.

To start the routine in FIG. 3, the engine ECU 90 obtains the information needed for the determination, such as the intake air amount GA of the engine 10, the rotational speed Ne of the engine 10, the coolant temperature Tw, and the temperature Tpf of the GPF 190 (step S100). Then, the engine ECU 90 uses the physical quantities and the like obtained in step S100 to calculate the deposition amount Dpm of the particulate matter in the GPF 190 through a drive history method or a differential pressure method corresponding to, for example, the running state of the engine 10 (step S110). Next, the engine ECU 90 determines whether a partial cylinder fuel cut-off control routine has already been executed to heat the exhaust gas purification catalyst 180 of the upstream purification device 18 and the GPF 190 of the downstream purification device 19 (step S120).

When determining that the partial cylinder fuel cut-off control routine has not been executed (step S120: YES), the engine ECU 90 determines whether the deposition amount Dpm calculated in step S110 is greater than or equal to a preset threshold value D1 (for example, approximately 5000 mg) (step S130). When determining that the deposition amount Dpm is less than the threshold value D1 (step S130: NO), the engine ECU 90 temporarily ends the routine at that point. When determining that the deposition amount Dpm is greater than or equal to the threshold value D1 (step S130: YES), the engine ECU 90 determines whether the temperature Tpf of the GPF 190 obtained in step S100 is less than a preset partial cylinder fuel cut-off control start temperature (specific temperature) Tx (step S140). The partial cylinder fuel cut-off control start temperature Tx is defined in advance in accordance with the environment in which the hybrid electric vehicle 1 is used. In the present embodiment, the partial cylinder fuel cut-off control start temperature Tx is approximately 600° C.

When determining that the temperature Tpf of the GPF 190 is greater than or equal to the partial cylinder fuel cut-off control start temperature Tx (step S140: NO), the engine ECU 90 temporarily ends the routine at that point. When determining that the temperature Tpf of the GPF 190 is less than the partial cylinder fuel cut-off control start temperature Tx (step S140: YES), the engine ECU 90 determines whether there is a communication anomaly such as delay or interruption in a communication frame between the engine ECU 90 and the HEVECU 60, that is, whether the communication is normal (step S150). For example, the engine ECU 90 simply needs to determine that there is a communication anomaly when the engine ECU 90 and the HEVECU 60 do not exchange a communication frame during a specific time interval or longer since the beginning of the routine of FIG. 3, and the engine ECU 90 simply needs to determine that there is no communication anomaly when the engine ECU 90 and the HEVECU 60 exchange a communication frame during a time interval that is shorter than the specific time interval.

When there is no communication anomaly, that is, when the communication is normal (step S150: YES), the engine ECU 90 sets a partial cylinder fuel cut-off flag to ON to execute the partial cylinder fuel cut-off control routine (S160). Then, the engine ECU 90 temporarily ends the routine of FIG. 3. When there is a communication anomaly, that is, when the communication is not normal (step S150: NO), the engine ECU 90 compares the rotational speed Ne with a partial cylinder fuel cut-off execution rotational speed Nex (step S155). When determining that the rotational speed Ne is less than the partial cylinder fuel cut-off execution rotational speed Nex (step S155: YES), the engine ECU 90 ends the routine of FIG. 3. In this case, the partial cylinder fuel cut-off control routine is not started. When determining that the rotational speed Ne is greater than or equal to the partial cylinder fuel cut-off execution rotational speed Nex (step S155: NO), the engine ECU 90 sets the partial cylinder fuel cut-off flag to ON to execute the partial cylinder fuel cut-off control routine and start a catalyst heating control (S160). Then, the engine ECU 90 temporarily ends the routine of FIG. 3. The partial cylinder fuel cut-off execution rotational speed Nex is defined in advance in correspondence with the resonant frequency of the hybrid electric vehicle 1. In the present embodiment, the partial cylinder fuel cut-off execution rotational speed Nex is, for example, approximately 2000 rpm.

When determining that the partial cylinder fuel cut-off control routine has already been executed (step S120: NO), the engine ECU 90 determines whether the deposition amount Dpm calculated in step S110 is greater than or equal to a preset threshold value D0 (step S170). The threshold value D0 is smaller than the threshold value D1 and is, for example, approximately 3000 mg. When determining that the deposition amount Dpm is less than the threshold value D0 (step S170: NO), the engine ECU 90 sets the partial cylinder fuel cut-off flag to OFF at that point and ends the partial cylinder fuel cut-off control routine (step S190). Then, the engine ECU 90 temporarily ends the routine of FIG. 3. When determining that the deposition amount Dpm is greater than or equal to the threshold value D0 (step S170: YES), the engine ECU 90 determines whether there is a communication anomaly such as delay or interruption in a communication frame between the engine ECU 90 and the HEVECU 60, that is, whether the communication is normal (step S180). The method for determining a communication anomaly may be the same as that of step S150.

When there is no communication anomaly, that is, when the communication is normal (step S180: YES), the engine ECU 90 temporarily ends the routine of FIG. 3. When there is a communication anomaly, that is, when the communication is not normal (step S180: NO), the engine ECU 90 compares the rotational speed Ne with the partial cylinder fuel cut-off execution rotational speed Nex (step S185). When determining that the rotational speed Ne is less than the partial cylinder fuel cut-off execution rotational speed Nex (step S185: YES), the engine ECU 90 sets the partial cylinder fuel cut-off flag to OFF to end the partial cylinder fuel cut-off control routine and end the catalyst heating control (S190). Then, the engine ECU 90 temporarily ends the routine of FIG. 3.

Figure 4:
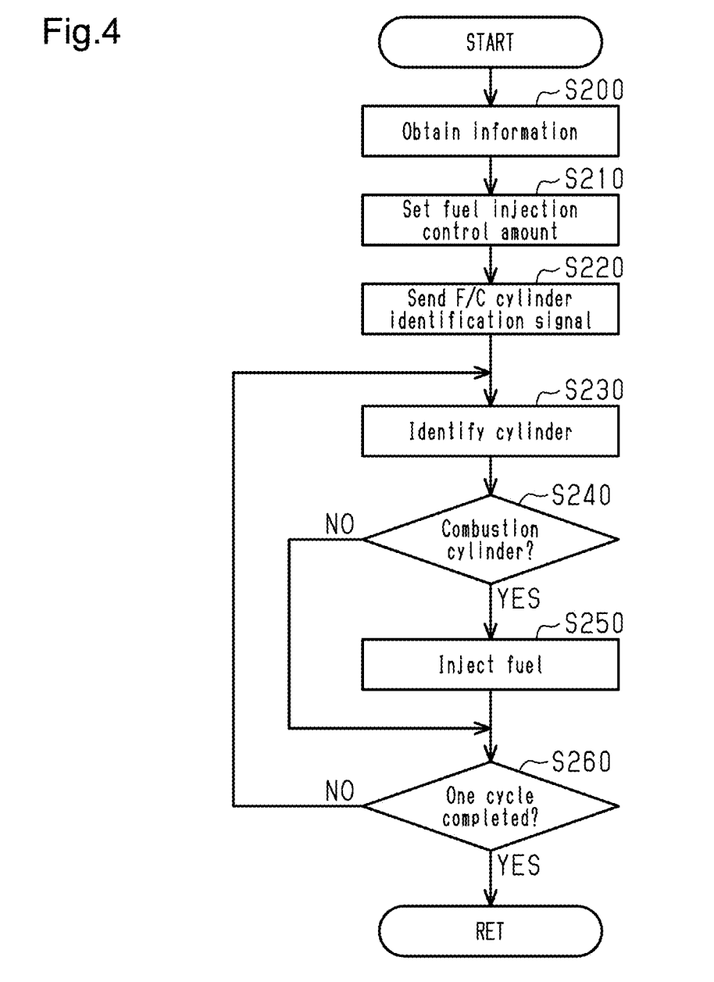
FIG. 4 is a flowchart illustrating a partial cylinder fuel cut-off control routine executed in the vehicle of FIG. 1.

The partial cylinder fuel cut-off control routine that heats the exhaust gas purification catalyst 180 and the GPF 190 will now be described. FIG. 4 is a flowchart illustrating the partial cylinder fuel cut-off control routine executed by the engine ECU 90 at the specific time interval when the partial cylinder fuel cut-off flag is set to ON in the routine of FIG. 3. The partial cylinder fuel cut-off control routine is executed until the partial cylinder fuel cut-off flag is set to OFF during the operation of the engine 10 with load in correspondence with the depression of the accelerator pedal 74 by the driver.

To start the partial cylinder fuel cut-off control routine, the engine ECU 90 obtains the information needed for the control (step S200). Examples of the information include the intake air amount GA of the engine 10, the rotational speed Ne of the engine 10, the coolant temperature Tw, the temperature Tpf of the GPF 190, the crank position from the crank angle sensor 80, the requested power Pe* from the HEVECU 60, and the target rotational speed Ne* from the HEVECU 60. In a case where there is a communication anomaly in step S150 of FIG. 3 and the rotational speed Ne is greater than or equal to the partial cylinder fuel cut-off execution rotational speed Nex in step S155, the engine ECU 90 obtains the accelerator pedal Acc and the vehicle speed V instead of obtaining the information needed for the control, such as the requested power Pe* and the target rotational speed Ne* from the HEVECU 60.

Subsequent to the process of step S200, the engine ECU 90 sets a fuel injection control amount such as a fuel injection timing and a fuel injection end timing (step S210). In step S210, the engine ECU 90 sets, to zero, the amount of fuel injected into a certain cylinder 11 (for example, first cylinder #1) of the cylinders 11 of the engine 10. In step S210, the engine ECU 90 increases the amounts of fuel injected into the remaining cylinders 11 other than the certain cylinder 11 (for example, second cylinder #2, third cylinder #3, and fourth cylinder #4) by, for example, 20% to 25% (in the present embodiment, 20%) of the fuel injection amount that should be supplied to the certain cylinder (first cylinder #1), thereby increasing (enriching) the amount of fuel relative to air. In the following description, stopping the supply of fuel is referred to as the fuel cut-off (F/C), the cylinder 11 in which the supply of fuel is stopped is referred to as the fuel cut-off cylinder, and the cylinder 11 to which fuel is supplied is referred to as the combustion cylinder.

Subsequent to step S210, the engine ECU 90 sends a fuel cut-off cylinder identification signal to the HEVECU 60 (step S220). The fuel cut-off cylinder identification signal indicates the crank position of the fuel cut-off cylinder of the cylinders. After sending the fuel cut-off cylinder identification signal to the HEVECU 60 in step S220, the engine ECU 90 uses the crank position from the crank angle sensor 80 to identify the cylinder 11 of which a fuel injection start timing is reached (step S230). When determining through the identification process in step S230 that the fuel injection start timing of the fuel cut-off cylinder (first cylinder #1) is reached (step S240: NO), the engine ECU 90 proceeds to step S260. In this step, the engine ECU 90 determines whether fuel injection in one cycle in which the engine 10 is rotated twice is completed, without injecting fuel from the direct injection valve 15 corresponding to the cylinder 11 (step S260). While the supply of fuel to the fuel cut-off cylinder (first cylinder #1) is stopped, that is, during the fuel cut-off, the intake valve and exhaust valve of the fuel cut-off cylinder is opened and closed in the same manner as when fuel is supplied. When determining through the identification process in step S230 that the fuel injection start timing of any one of the combustion cylinders (second cylinder #2, third cylinder #3, and fourth cylinder #4) is reached (step S240: YES), the engine ECU 90 causes the direct injection valve 15 corresponding to that combustion cylinder to inject fuel (step S250) and then determines whether fuel injection in one cycle is completed (step S260).

When determining that fuel injection in one cycle is not completed (step S260: NO), the engine ECU 90 repeatedly executes the processes of steps S230 to S250. While this routine is executed, the open degree of the throttle valve 14 is set using the requested power Pe* and target rotational speed Ne* (requested torque) or using the accelerator pedal Acc and vehicle speed V. Thus, the processes of steps S230 to S260 stop the supply of fuel to the fuel cut-off cylinder (first cylinder #1) and enriches the air-fuel ratio in the combustion cylinders (second cylinder #2, third cylinder #3, and fourth cylinder #4). When determining that fuel injection in one cycle is completed (step S260: YES), the engine ECU 90 executes the processes of step S200 and its subsequent steps again.

Figure 5:
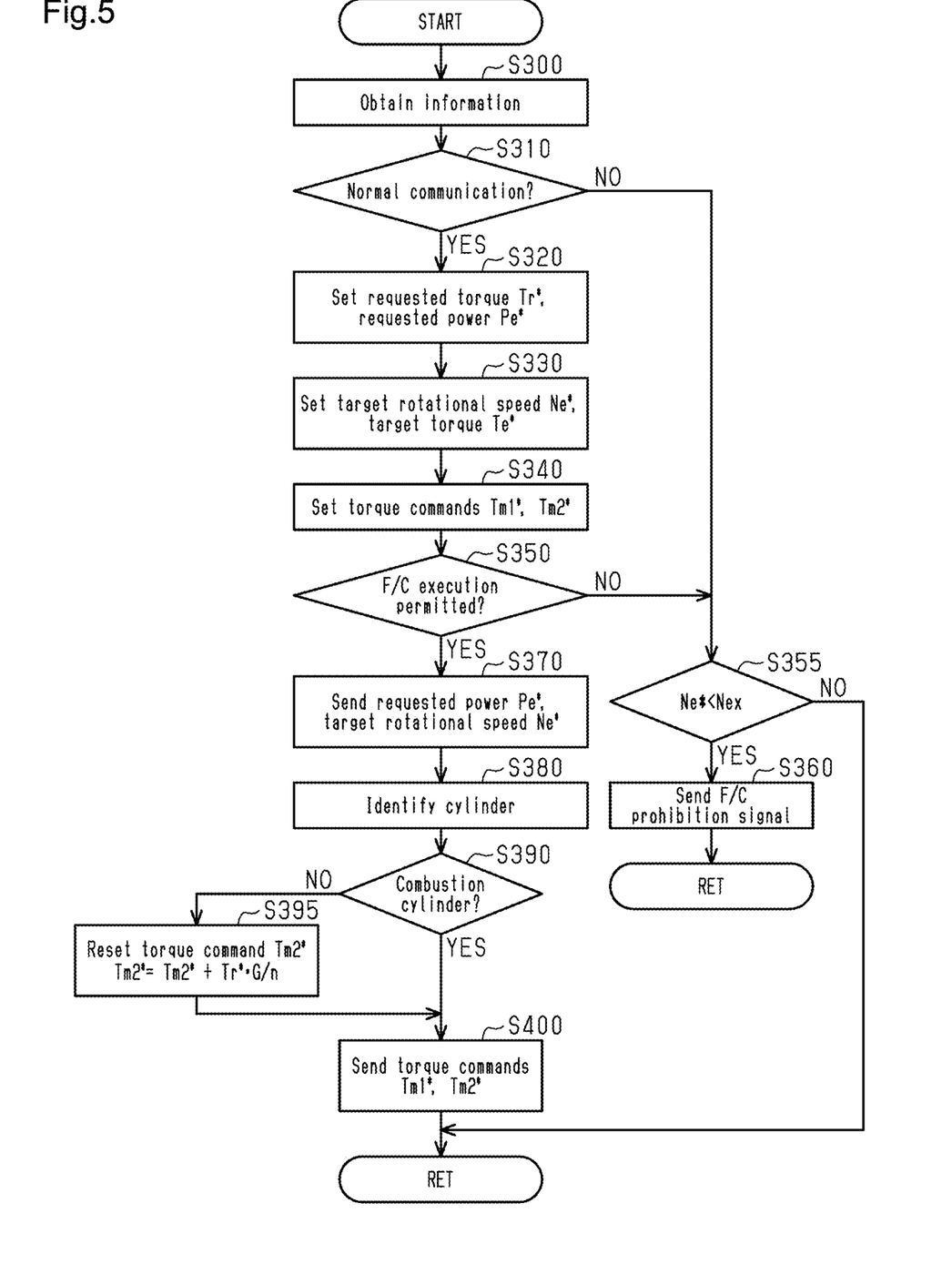
FIG. 5 is a flowchart illustrating a driving force compensation control routine executed in the vehicle of FIG. 1.

FIG. 5 is a flowchart illustrating a driving force compensation control routine executed repeatedly by the HEVECU 60 at the specific time interval in line with the partial cylinder fuel cut-off control routine after the engine ECU 90 sets the partial cylinder fuel cut-off flag to ON in step S160 of FIG. 3. In a case where a communication interruption occurs in a communication frame between the engine ECU 90 and the HEVECU 60, even when the rotational speed Ne is greater than or equal to the partial cylinder fuel cut-off execution rotational speed Nex, the HEVECU 60 is unable to obtain the information related to the partial cylinder fuel cut-off flag and thus does not start the driving force compensation control routine.

To start the driving force compensation control routine, the HEVECU 60 obtains the information needed for the control (step S300). Examples of the information include the accelerator pedal Acc, the vehicle speed V, the crank position from the crank angle sensor 80, the rotational speeds Nm1 and Nm2 of the motor generators MG1 and MG2, the SOC, target charging/discharging power Pb*, allowable charge power Win, and allowable discharge power Wout of the power storage device 40, and the fuel cut-off cylinder identification signal (crank position) from the engine ECU 90.

Subsequent to the process of step S300, the HEVECU 60 determines whether there is a communication anomaly such as delay or interruption (that is, whether the communication is normal) in a communication frame between the engine ECU 90, the HEVECU 60, the MGECU 55, and the power supply management ECU 45 (more specifically, between the engine ECU 90 and the HEVECU 60, between the HEVECU 60 and the MGECU 55, and between the HEVECU 60 and the power supply management ECU 45) (step S310). For example, the engine ECU 90 simply needs to determine that there is a communication anomaly when two of the ECUs do not exchange a communication frame during the specific time interval or longer since the beginning of the driving force compensation control routine, and the engine ECU 90 simply needs to determine that there is no communication anomaly when two of the ECUs exchange a communication frame during a time interval that is shorter than the specific time interval.

When there is a communication anomaly, that is, when the communication is not normal (step S310: NO), the HEVECU 60 compares the target rotational speed Ne* with the partial cylinder fuel cut-off execution rotational speed Nex (step S355). When determining that the target rotational speed Ne* is less than the partial cylinder fuel cut-off execution rotational speed Nex (step S355: YES), the HEVECU 60 sends a fuel cut-off prohibition signal such that the engine ECU 90 sets the partial cylinder fuel cut-off flag to OFF (S360). Then, the HEVECU 60 temporarily ends the driving force compensation control routine. In this case, the execution of the partial cylinder fuel cut-off control routine by the engine ECU 90 is suspended or stopped. When determining that the target rotational speed Ne* is greater than or equal to the partial cylinder fuel cut-off execution rotational speed Nex (step S355: YES), the HEVECU 60 temporarily ends the driving force compensation control routine. The partial cylinder fuel cut-off execution rotational speed Nex is defined in advance in correspondence with the resonant frequency of the hybrid electric vehicle 1. In the present embodiment, the partial cylinder fuel cut-off execution rotational speed Nex is, for example, approximately 2000 rpm.

When there is no communication anomaly, that is, when the communication is normal (step S310: YES), the HEVECU 60 uses the accelerator pedal Acc and vehicle speed V to set the requested travel power Pd* and uses, for example, the requested torque Tr* (requested travel power Pd*) and the target charging/discharging power Pb* of the power storage device 40 to set the requested power Pe* for the engine 10 (step S320).

Subsequent to the step of step S320, the HEVECU 60 refers to a map (not shown) to obtain a rotational speed at which the engine 10 runs efficiently and which corresponds to the requested power Pe*, and sets the target rotational speed Ne* of the engine 10 to the larger one of the obtained rotational speed and the lower limit rotational speed Nelim, which is the lower limit value of the rotational speed of the engine 10 (step S330). Further, in step S330, the HEVECU 60 sets a target torque Te* of the engine 10 to a value obtained by dividing the requested power Pe* by the target rotational speed Ne*. The HEVECU 60 sets the torque command Tm1* for the motor generator MG1 corresponding to the target torque Te* and target rotational speed Ne* and sets the torque command Tm2* for the motor generator MG2 corresponding to the requested torque Tr* and the torque command Tm1* in the range of the allowable charge power Win and the allowable discharge power Wout of the power storage device 40 (step S340).

Subsequently, the HEVECU 60 determines whether the execution of the partial cylinder fuel cut-off control routine (i.e., the execution of fuel cut-off control for a certain cylinder 11) is permitted (step S350). In step S350, the HEVECU 60 calculates a driving torque that lacks due to the fuel cut-off for one cylinder 11, that is, the torque that is no longer output from the engine 10 due to the fuel cut-off (hereinafter referred to as the lacking torque). More specifically, the HEVECU 60 multiplies, by a value obtained by dividing the requested torque Tr* set in step S320 by the number n of cylinders of the engine 10 (n=4 in the present embodiment), a gear ratio G between the rotor of the motor generator MG2 and the drive shaft DS to calculate the lacking torque (Tr*·G/n). Further, in step S350, the HEVECU 60 determines whether the motor generator MG2 is capable of compensating for the lacking torque using the torque commands Tm1* and Tm2* set in step S340 and using the allowable charge power Win and allowable discharge power Wout of the power storage device 40.

In the determination process of step S350, when determining that the motor generator MG2 is incapable of compensating for the driving torque that lacks due to fuel cut-off for the certain cylinder 11 (step S350: NO), the HEVECU 60 advances the process to the above-described step S355. When determining that the motor generator MG2 is capable of compensating for the driving torque that lacks due to fuel cut-off for the certain cylinder 11 (step S350: YES), fuel cut-off is permitted and the HEVECU 60 sends, to the engine ECU 90, the requested power Pe* set in step S320 and the target rotational speed Ne* set in step S330 (step S370).

After sending the requested power Pe* and target rotational speed Ne* to the engine ECU 90, the HEVECU 60 uses the crank position from the crank angle sensor 80 and the fuel cut-off cylinder identification signal (crank position) received from the engine ECU 90 in step S300 to determine a cylinder 11 of which the fuel injection start timing will be reached next (step S390). When determining through the determination process of step S390 that the fuel injection start timing of any one of the combustion cylinders (second cylinder #2, third cylinder #3, or fourth cylinder #4) will be reached (step S390: YES), the HEVECU 60 sends, to the MGECU 55, the torque commands Tm1* and Tm2* set in step S340 (step S400). Then, the HEVECU 60 temporarily ends the driving force compensation control routine. When determining through the determination process of step S390 that the fuel injection start timing of the fuel cut-off cylinder (first cylinder #1) will be reached (step S390: NO), the HEVECU 60 resets the torque command Tm2* for the motor generator MG2 (step S395).

In step S395, the HEVECU 60 sets a new torque command Tm2* to the sum of the torque command Tm2* set in step S340 and the lacking torque (Tr*·G/n). Subsequent to the process of step S395, the HEVECU 60 sends, to the MGECU 55, the torque command Tm1* set in step S340 and the torque command Tm2* reset in step S395 (step S400) and then temporarily ends the driving force compensation control routine. Thus, while the supply of fuel to the fuel cut-off cylinder of the engine 10 is stopped (during fuel cut-off), the MGECU 55 controls the motor generator MG1 such that the engine 10 is rotated at the target rotational speed Ne* and controls the motor generator MG2 so as to compensate for the lacking torque.

In the hybrid electric vehicle 1, when the routines shown in FIGS. 3 to 5 are executed, the deposition amount Dpm of the particulate matter in the GPF 190 of the downstream purification device 19 becomes greater than or equal to the threshold value D1. In this case, in order to heat the exhaust gas purification catalyst 180 of the upstream purification device 18 and the GPF 190 of the downstream purification device 19, the supply of fuel to at least one of the cylinders 11 of the engine 10 is stopped whereas fuel is supplied to the remaining cylinders 11 in a period during which the engine 10 is operated with load in correspondence with the depression of the accelerator pedal 74 by the driver. During the execution of fuel cut-off, the motor generator MG2 (power generation device) is controlled so as to compensate for the torque (driving force) that lacks due to the stopped supply of fuel to at least any one of the cylinders 11.

During the execution of the partial cylinder fuel cut-off control routine and the driving force compensation control routine, the information of the partial cylinder fuel cut-off flag and the information of the fuel cut-off cylinder identification signal, requested power Pe*, and target rotational speed Ne* are delivered between the engine ECU 90 and HEVECU 60 through communication, the information of the torque commands Tm1* and Tm2* is delivered between the HEVECU 60 and MGECU 55 through communication, and the information of the allowable charge power Win and allowable discharge power Wout is delivered between the HEVECU 60 and the power supply management ECU 45 through communication. In order to determine whether an anomaly possibly occurs in the sending and receiving of the partial cylinder fuel cut-off flag and the fuel cut-off cylinder identification signal between the engine ECU 90 and the HEVECU 60, the routine of FIG. 3 determines whether there is a communication anomaly such as delay or interruption in a communication frame between the engine ECU 90 and the HEVECU 60 before the sending and receiving of the partial cylinder fuel cut-off flag and the fuel cut-off cylinder identification signal. At this point, if there is a communication anomaly between the engine ECU 90 and the HEVECU 60, delay or interruption possibly occurs even when the partial cylinder fuel cut-off flag and the fuel cut-off cylinder identification signal are sent and received. Thus, prohibiting the partial cylinder fuel cut-off control limits variations in the driving force that occur due to asynchronization between a decrease in the driving force resulting from the fuel cut-off control and the compensation for the driving force by the motor generator MG2. Examples of the variations include the difference between the point in time of the fuel cut-off control and the point in time of compensating for the torque that lacks due to the fuel cut-off. In addition, in order to determine whether an anomaly possibly occurs in the sending and receiving of the torque commands Tm1* and Tm2* between the HEVECU 60 and the MGECU 55 or anomalies possibly occur in the values of the torque commands Tm1* and Tm2*, the driving force compensation control routine determines whether there is a communication anomaly such as delay or interruption in a communication frame between the HEVECU 60 and the MGECU 55 and in a communication frame between the HEVECU 60 and the power supply management ECU 45 before the sending and receiving of the torque commands Tm1* and Tm2* between the HEVECU 60 and the MGECU 55. At this point, if there is a communication anomaly between the HEVECU 60 and the MGECU 55, delay or interruption possibly occurs even when the torque commands Tm1* and Tm2* are sent and received. Also, at this point, if there is a communication anomaly between the HEVECU 60 and the power supply management ECU 45, the values of the torque commands Tm1* and Tm2* may be improper. Thus, prohibiting the partial cylinder fuel cut-off control limits variations in the driving force that occur due to asynchronization between a decrease in the driving force resulting from the fuel cut-off control and the compensation for the driving force by the motor generator MG2. Examples of the variations include the difference between the point in time of the fuel cut-off control and the point in time of compensating for the torque that lacks due to the fuel cut-off.

When a communication anomaly such as delay or interruption occurs in the communication frame between two of the ECUs but the rotational speed Ne or the target rotational speed Ne* of the engine 10 is greater than or equal to the partial cylinder fuel cut-off execution rotational speed Nex, fuel cut-off is permitted without executing the driving force compensation control. Since the driving force compensation control is not executed, the driving force varies. However, the driving force varies to a small extent when the rotational speed Ne or the target rotational speed Ne* of the engine 10 is greater than or equal to the partial cylinder fuel cut-off execution rotational speed Nex as compared with when the rotational speed Ne or the target rotational speed Ne* of the engine 10 is less than the partial cylinder fuel cut-off execution rotational speed Nex. Thus, when the rotational speed Ne or the target rotational speed Ne* of the engine 10 is greater than or equal to the partial cylinder fuel cut-off execution rotational speed Nex, fuel cut-off is permitted without executing the driving force compensation control so that the regeneration of the GPF 190 is prioritized over limiting variations in the driving force.

The correspondence between the items in the above-described embodiment and the items described in the claims is as follows. The first electronic control unit corresponds to the engine ECU 90. The second electronic control unit corresponds to the HEVECU 60. The partial cylinder fuel cut-off control corresponds to the partial cylinder fuel cut-off control routine. The control information of the partial cylinder fuel cut-off control corresponds to the partial cylinder fuel cut-off flag and the fuel cut-off cylinder identification signal. The driving force compensation control corresponds to the driving force compensation control routine. The third electronic control unit corresponds to the MGECU 55. The command value corresponds to the torque commands Tm1* and Tm2* set in step S340.

In the above-described embodiment, the HEVECU 60 is separate from the MGECU 55. Instead, the HEVECU 60 may function as the MGECU 55. In this case, the HEVECU 60 sets the torque commands Tm1* and Tm2* for the motor generators MG1 and MG2 corresponding to, for example, the requested torque Tr* and the target rotational speed Ne* in the range of the allowable charge power Win and the allowable discharge power Wout of the power storage device 40, and executes switching control for the first inverter 51, the second inverter 52, and the converter 53 based on the set torque commands Tm1* and Tm2*.

In the above-described embodiment, when the execution of the partial cylinder fuel cut-off control routine is permitted, the air-fuel ratios in all the combustion cylinders other than the fuel cut-off cylinder are enriched. However, this configuration does not need to be employed. That is, in the hybrid electric vehicle 1, instead of enriching the air-fuel ratio in each combustion cylinder at the beginning of the partial cylinder fuel cut-off control routine, the air-fuel ratio of the combustion cylinder may be set to a stoichiometric air-fuel ratio. In such a configuration, although the time of heating the upstream and downstream purification devices 18 and 19 is lengthened as compared with when enriching the air-fuel ratio in each combustion cylinder, the temperatures of the upstream and downstream purification devices 18 and 19 can be sufficiently increased by the heat caused by the reaction of unburned fuel when a sufficient amount of oxygen exists. Additionally, a sufficient amount of oxygen can be supplied to the heated upstream and downstream purification devices 18 and 19 by stopping the supply of fuel to a certain cylinder 11 in a continuous manner.

In the above-described embodiment, the partial cylinder fuel cut-off control is executed in order to regenerate the GPF 190. However, this configuration does not need to be employed. For example, when the downstream air-fuel ratio sensor 86 detects a rich air-fuel ratio, the partial cylinder fuel cut-off control may be executed in order to exponentially increase oxygen in the exhaust gas purification catalyst 180. In this case, instead of determining that the deposition amount Dpm is greater than or equal to the threshold value D1 and executing the partial cylinder fuel cut-off control on the condition that the temperature Tpf of the GPF 190 is less than the partial cylinder fuel cut-off control start temperature Tx, the partial cylinder fuel cut-off control simply needs to be executed on the condition that, for example, the downstream air-fuel ratio AFr is less than a threshold value AF1.

The engine 10 of the hybrid electric vehicle 1 is an inline engine and the partial cylinder fuel cut-off control routine is established so as to stop the supply of fuel to at least one of the cylinders 11 in one cycle. However, this configuration does not need to be employed. That is, the engine 10 of the hybrid electric vehicle 1 may be a V engine, a horizontally opposed engine, or a W engine in which each bank includes an exhaust gas purification device. In this case, the partial cylinder fuel cut-off control routine simply needs to be established so as to stop the supply of fuel to at least one of the cylinders 11 in each of the banks in one cycle. This configuration allows a sufficient amount of oxygen to be delivered to the exhaust gas purification device of each bank of the V engine or the like.

The downstream purification device 19 may include an exhaust gas purification catalyst (three-way catalyst) arranged on the upstream side and a gasoline particulate filter arranged downstream of the exhaust gas purification catalyst. In this case, the upstream purification device 18 may be omitted from the hybrid electric vehicle 1. The downstream purification device 19 may include only the gasoline particulate filter. In this case, the partial cylinder fuel cut-off control routine is executed to heat the exhaust gas purification catalyst of the upstream purification device 18, so that high-temperature exhaust gas flowing from the upstream purification device 18 heats the downstream purification device 19 (GPF 190).

In the above-described embodiment, the hybrid electric vehicle 1 is a two-motor hybrid electric vehicle in which the motor generator MG2 and the engine 10 connected to the motor generator MG1 via the planetary gear 30 are connected to the drive shaft DS. Instead, the hybrid electric vehicle 1 may be a one-motor hybrid electric vehicle that does not include the planetary gear 30, the motor generator MG1, and the first inverter 51. In this case, the HEVECU 60 sets the target rotational speed Ne* of the engine 10 corresponding to the requested power Pe* and further sets the torque command Tm2* for the motor generator MG2 corresponding to, for example, the requested torque Tr* and the target rotational speed Ne* in the range of the allowable charge power Win and the allowable discharge power Wout of the power storage device 40.

In the hybrid electric vehicle 1, the motor generator MG1 may be coupled to the sun gear 31 of the planetary gear 30, the output member may be coupled to the ring gear 32, and the engine 10 and the motor generator MG2 may be coupled to the planetary carrier 34. A stepped transmission may be coupled to the ring gear 32 of the planetary gear 30. Further, in the hybrid electric vehicle 1, the planetary gear 30 may be replaced with a four-element complex planetary gear mechanism including two planetary gears. In this case, the engine 10 may be coupled to an input element of the complex planetary gear mechanism, the output member may be coupled to an output element of the complex planetary gear mechanism, the motor generator MG1 may be coupled to one of the remaining two rotational elements, and the motor generator MG2 may be coupled to the other one of the remaining two rotational elements. The complex planetary gear mechanism may include a clutch that couples two of the four rotational elements to each other and may include a brake capable of fixing any one of the four rotational elements such that the rotational element cannot rotate. The hybrid electric vehicle 1 may be a plug-in hybrid electric vehicle of which the power storage device 40 can be charged by the power from an external power supply, such as a domestic power supply or a quick charger installed in a station.

In such a case, the engine ECU 90 uses the accelerator pedal Acc and the vehicle speed V, regardless of the requested power Pe* and the target rotational speed Ne* sent from the HEVECU 60, to execute the intake air amount control, fuel injection control, and ignition timing control, thereby causing the hybrid electric vehicle 1 to travel in a fail-safe mode only by operating the engine 10. Instead, the hybrid electric vehicle 1 can also travel in the configuration. That is, the engine ECU 90 causes the engine 10 to stop running and the HEVECU 60 sets the torque command Tm2* in the range of the allowable charge power Win and the allowable discharge power Wout of the power storage device 40 such that the torque corresponding to the requested torque Tr* is output to the drive shaft DS from the motor generator MG2.

Modifications Related to Electronic Control Unit

Each of the electronic control units 55, 60, and 90 is not limited to a device that includes a CPU and a ROM and executes software processing. For example, at least part of the processes executed by the software in the above-described embodiments may be executed by hardware circuits dedicated to executing these processes (such as ASIC). That is, each of the electronic control units 55, 60, and 90 may be modified as long as it has any one of the following configurations (a) to (c): (a) a configuration including a processor that executes all of the above-described processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software execution devices each including a processor and a program storage device and a plurality of dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hybrid electric vehicle, wherein the hybrid electric vehicle includes:
   a multi-cylinder internal combustion engine including an exhaust system provided with a catalyst that purifies exhaust gas; and
   an electric motor,
   the hybrid electric vehicle is configured to transmit, to a driven wheel, driving force from the multi-cylinder internal combustion engine and the electric motor,
   the controller comprises:
   a first electronic control unit; and
   a second electronic control unit,
   the first electronic control unit is
      configured to execute a partial cylinder fuel cut-off control that stops supply of fuel to at least one of cylinders and supplies fuel to the remaining ones of the cylinders other than the at least one of cylinders and
      configured to send control information of the partial cylinder fuel cut-off control to the second electronic control unit,
   the second electronic control unit is configured to receive the control information of the partial cylinder fuel cut-off control and then execute a driving force compensation control that controls the electric motor based on the received control information of the partial cylinder fuel cut-off control so as to compensate for, using the driving force of the electric motor, a decrease in the driving force of the multi-cylinder internal combustion engine that results from the execution of the partial cylinder fuel cut-off control, and
   the first electronic control unit is further configured to prohibit the execution of the partial cylinder fuel cut-off control in response to a determination that the first electronic control unit and the second electronic control unit fail to exchange a communication frame during a specific time interval or longer.

2. The controller according to claim 1, further comprising a third electronic control unit, wherein
   the second electronic control unit is configured to
      calculate a command value used to compensate for, using the driving force of the electric motor, the decrease in the driving force of the multi-cylinder internal combustion engine based on the received control information of the partial cylinder fuel cut-off control and send the command value to the third electronic control unit, the third electronic control unit is configured to receive the command value and then control driving of the electric motor in correspondence with the received command value, and the first electronic control unit is further configured to prohibit the execution of the partial cylinder fuel cut-off control in response to a determination that the second electronic control unit and the third electronic control unit fail to exchange a further communication frame during a further specific time interval or longer.

3. The controller according to claim 1, wherein the second electronic control unit is configured to not start the driving force compensation control in response to a communication interruption occurring in the communication frame between the first electronic control unit and the second electronic control unit.

4. The controller according to claim 1, wherein the first electronic control unit is configured to permit the execution of the partial cylinder fuel cut-off control in response to the determination that the first electronic control unit and the second electronic control unit fail to exchange the communication frame during the specific time interval or longer, and a further determination that a rotational speed of the multi-cylinder internal combustion engine is greater than or equal to a specific rotational speed.

5. The controller according to claim 4, wherein the first electronic control unit is configured to permit the execution of the partial cylinder fuel cut-off control, without executing the driving force compensation control, in response to the determination that the first electronic control unit and the second electronic control unit fail to exchange the communication frame during the specific time interval or longer and the further determination that the rotational speed of the multi-cylinder internal combustion engine is greater than or equal to the specific rotational speed.

6. The controller according to claim 1, wherein the first electronic control unit is configured to determine whether there is a communication anomaly between the first electronic control unit and the second electronic control unit in response to a deposition amount of particulate matter in the catalyst being greater than or equal to a predetermined threshold value.

7. The controller according to claim 6, wherein
the predetermined threshold value is set as a first predetermined threshold value when the partial cylinder fuel cut-off control routine has been executed, and as a second predetermined threshold value when the partial cylinder fuel cut-off control routine has not been executed, wherein the first predetermined threshold value is less than the second predetermined threshold value.

8. A controller for a hybrid electric vehicle, wherein
the hybrid electric vehicle includes:

a multi-cylinder internal combustion engine including an exhaust system provided with a catalyst that purifies exhaust gas; and an electric motor, the hybrid electric vehicle is configured to transmit, to a driven wheel, driving force from the multi-cylinder internal combustion engine and the electric motor, the controller comprises:

a first electronic control unit; and a second electronic control unit, the first electronic control unit includes circuitry configured to execute a partial cylinder fuel cut-off control that stops supply of fuel to at least one of cylinders and supplies fuel to the remaining ones of the cylinders other than the at least one of cylinders and configured to send control information of the partial cylinder fuel cut-off control to the second electronic control unit, the second electronic control unit includes circuitry configured to receive the control information of the partial cylinder fuel cut-off control and then execute a driving force compensation control that controls the electric motor based on the received control information of the partial cylinder fuel cut-off control so as to compensate for, using the driving force of the electric motor, a decrease in the driving force of the multi-cylinder internal combustion engine that results from the execution of the partial cylinder fuel cut-off control, and the circuitry of the first electronic control unit is further configured to prohibit the execution of the partial cylinder fuel cut-off control in response to a determination that the first electronic control unit and the second electronic control unit fail to exchange a communication frame during a specific time interval or longer.

9. A method for controlling a hybrid electric vehicle, wherein
the hybrid electric vehicle includes:

a multi-cylinder internal combustion engine including an exhaust system provided with a catalyst that purifies exhaust gas;

an electric motor;

a first electronic control unit; and a second electronic control unit, the hybrid electric vehicle is configured to transmit, to a driven wheel, driving force from the multi-cylinder internal combustion engine and the electric motor, the method comprises:

by the first electronic control unit, executing a partial cylinder fuel cut-off control that stops supply of fuel to at least one of cylinders and supplies fuel to the remaining ones of the cylinders other than the at least one of cylinders and sending control information of the partial cylinder fuel cut-off control to the second electronic control unit;

by the second electronic control unit, receiving the control information of the partial cylinder fuel cut-off control and then executing a driving force compensation control that controls the electric motor based on the received control information of the partial cylinder fuel cut-off control so as to compensate for, using the driving force of the electric motor, a decrease in the driving force of the multi-cylinder internal combustion engine that results from the execution of the partial cylinder fuel cut-off control; and prohibiting the execution of the partial cylinder fuel cut-off control by the first electronic control unit in response to a determination that the first electronic control unit and the second electronic control unit fail to exchange a communication frame during a specific time interval or longer.

* * * * *